United States Patent [19]

Tomada

[11] 4,205,352
[45] May 27, 1980

[54] DEVICE FOR ENCODING AND RECORDING INFORMATION WITH PEAK SHIFT COMPENSATION

[75] Inventor: Franco Tomada, Pavone, Italy

[73] Assignee: Ing. C. Olivetti & C., S.p.A., Ivrea, Italy

[21] Appl. No.: 941,935

[22] Filed: Sep. 13, 1978

[30] Foreign Application Priority Data

Sep. 30, 1977 [IT] Italy ........................... 69162 A/77

[51] Int. Cl.² .............................................. G11B 5/09
[52] U.S. Cl. ............................................................. 360/45
[58] Field of Search .............................. 360/39, 40, 45

[56] References Cited

U.S. PATENT DOCUMENTS

| | | | |
|---|---|---|---|
| 3,067,422 | 12/1962 | Hunt | 360/45 |
| 3,879,342 | 4/1975 | Pzrel | 360/45 |
| 4,000,513 | 12/1976 | Precourt | 360/45 |

Primary Examiner—Vincent P. Canney
Attorney, Agent, or Firm—Schuyler, Birch, McKie & Beckett

[57] ABSTRACT

In a device for encoding and recording digital signals on a magnetic recording medium, precompensation in respect of errors which arise with high bit packing densities is effected by selectively advancing and delaying the signals. The delay or advance is obtained by presetting a counter according to the value of following and preceding signals.

5 Claims, 5 Drawing Figures

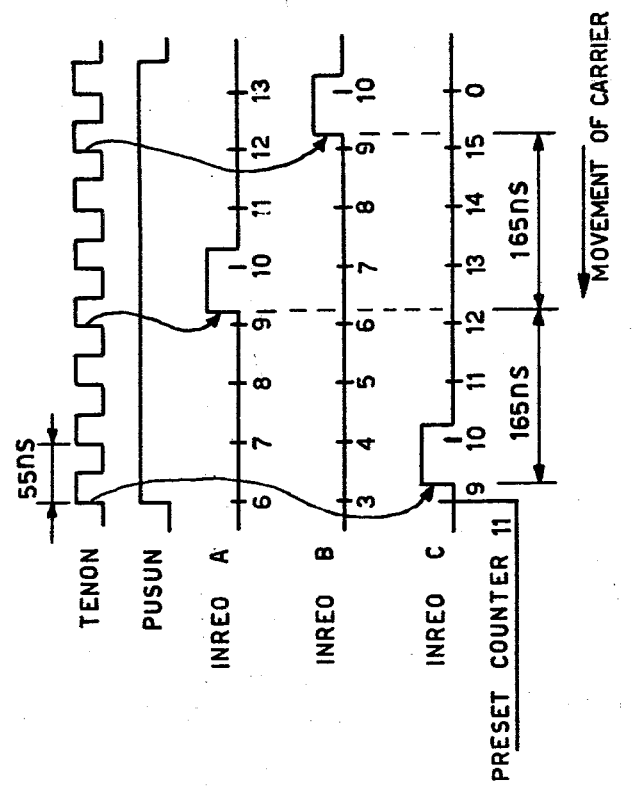

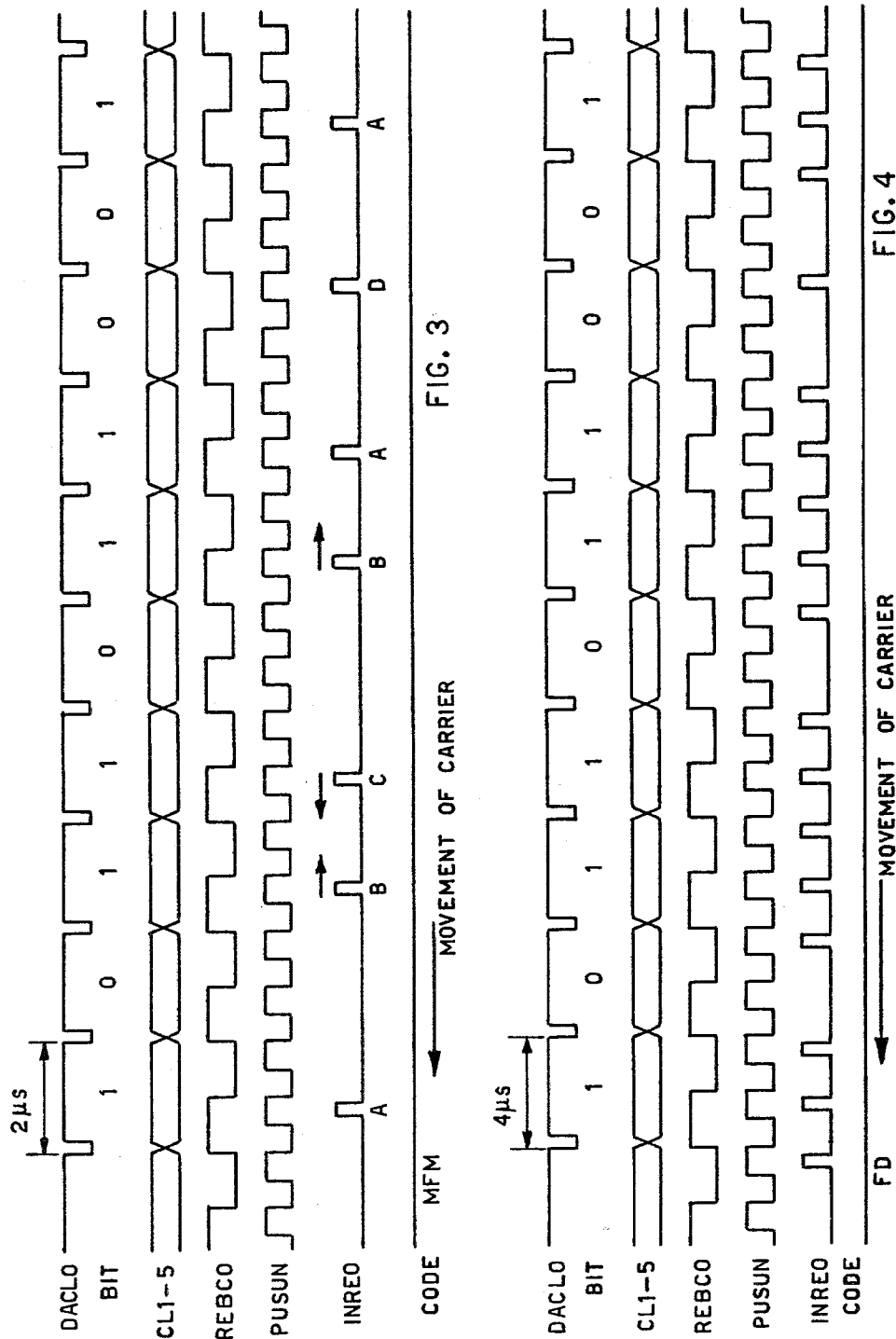

DEVICE FOR ENCODING AND RECORDING INFORMATION WITH PEAK SHIFT COMPENSATION

BACKGROUND OF THE INVENTION

The present invention relates to an arrangement for encoding and recording on a carrier, by means of a recording element, information emitted by a data source.

In known encoding arrangements, separate devices are employed for encoding and for precompensation, during the writing operation, to compensate for errors which it is anticipated may be produced during the reading stage. The precompensation of errors is a problem connected with recording by means of codes with a high bit packing density, that is codes which provide a high number of transitions per linear carrier unit (high b.p.i.). It is necessary to note that, in known arrangements, the encoding logic and the precompensation logic are designed expressly for a given code and it follows from this that each of these arrangements can be employed only for carriers using that given coding. Any modification which provides for variations in the coding or in the precompensation device involves, in known arrangements, modifications to the hardware logic and, in some cases, complete redesigning of the arrangement.

SUMMARY OF THE INVENTION

The main object of the present invention therefore consists in providing a single arrangement which is simple, not costly, flexible and readily modifiable for encoding and recording on a carrier and simultaneous precompensation of errors during the writing stage.

According to the present invention, there is provided a device for encoding and recording on a carrier, by means for a recording element, information emitted by a data source, characterised by encoding means for encoding the information coming from the data source in a predetermined recording code, the encoding means generating sequences of signals forming the input to the recording element, and error precompensation means included in the encoding means for selectively introducing advances or delays into the said sequences of signals.

One developement of the present invention provides a device capable of encoding information coming from a source in a code belonging to a plurality of recording codes. Thus, the encoding means can be controllable by means of external signals for encoding the information coming from the source in a code selected from among a plurality of recording codes.

A further development of the present invention consists in the use of a memory in the device such that the device can be adapted readily to any group of recording codes simply by varying the contents of the memory.

BRIEF DESCRIPTION OF THE DRAWINGS

FIG. 2 is a diagram of a memory;

FIGS. 3 and 4 are time diagrams of the encoding; and

FIG. 5 is a time diagram of the precompensation.

DETAILED DESCRIPTION OF THE PREFERRED EMBODIMENT

Figure 1:
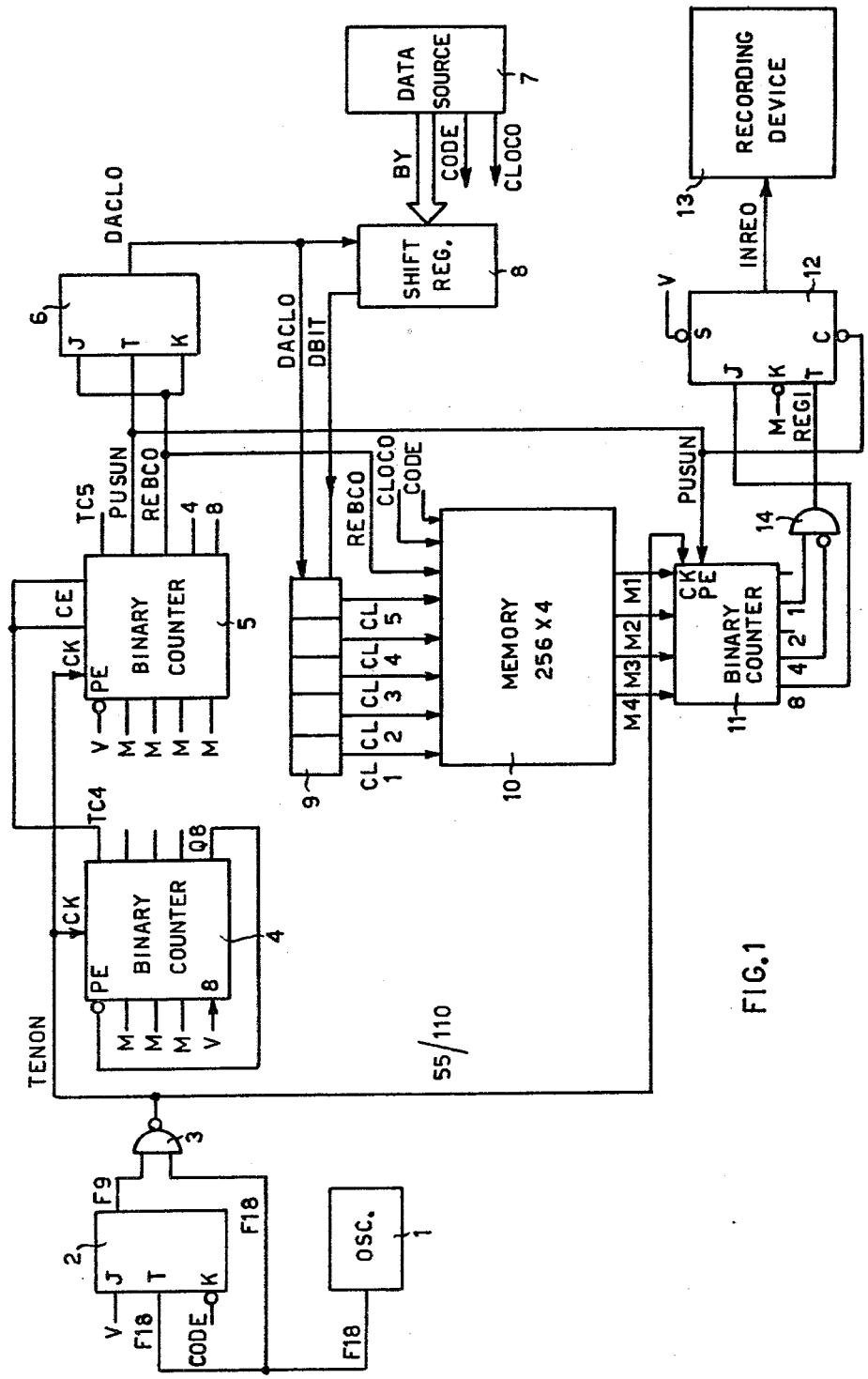
FIG. 1 is a logic diagram of a device embodying the invention.

The encoding and precompensation device of FIG. 1 comprises an oscillator 1 which generates a frequence of 18 MHz, a timing circuit formed by flip-flops 2 and 6 and binary counters 4 and 5, a data source 7, two shift registers 8 and 9, a memory 10, a binary counter 11, a flip-flop 12 and a recording device 13. The data source 7 and the device 13 will not be described in detail, since their construction does not concern the present invention. However, the data source 7 may be constituted by a computer, a controller receiving signals from a transmission line, a data reading device or other similar device. It is only required that the device 7 be able to supply coded information in the form of characters including a predetermined number of binary information units. These information characters are transferred to the shift register 8 serially character by character in the form of binary signals (bits) by means of the channel BY. Similarly, regarding the recording device 13, it can be said that this must comprise a recording carrier or support, such as, for example, a magnetic tape or a magnetic disc (rigid or flexible), and a corresponding recording element of the magnetic head type.

Those skilled in the art will appreciate the fact that the present arrangement is not confined to the above-mentioned applications, but may be used with advantage in all those systems employed in the field of data processing which require encoding with possible precompensation of errors.

In FIG. 1 the signal V indicates connection to a constant signal having a logical 1 level, while the signal M indicates connection to a constant signal having logical 0 level. The oscillator 1 generates the timing signal F18 having a period of 55 ns which is applied to the timing input of the flip-flop 2 and to one of the inputs of a NAND gate 3. The reset input K is connected to a signal CODE coming from the data source 7 and signifying the choice of the recording code. If CODE=0, the flip-flop 2 emits a signal F9 of logical 1 level and therefore enables the NAND circuit 3 to pass the signal F18. It follows that TENON=F18. On the other hand, if CODE=1, the signal F9 has a period of 110 ns and it follows that the signal TENON will also have a period of 110 ns. The signal TENON is sent to the incrementing input of the counters 4, 5 and 11. The counter 4 counts from eight to fifteen and then supplies the end-of-count signal TC4 at every eight signals TENON.

The signals TENON and TC4 are sent respectively to the incrementing and enabling inputs of the counter 5. The counter 5 emits as output the signals REBCO and PUSUN, REBCO having a period double that of PUSUN. The flip-flop 6 has its inputs J and K connected to the signal REBCO and the timing input T connected to the signal PUSUN. The result is that the signal DACLO generated by the flip-flop 6 has a period equal to that of the signal REBCO, but in which the duration of the negative half-wave is much smaller than the duration of the positive half-wave (see FIGS. 3 and 4).

The signal DACLO is sent to the shift inputs of the shift registers 8 and 9. The result is that the register 8 emits a bit signal at each period of DACLO and, correspondingly, the shift register 9 stores a fresh bit signal and shifts its contents to the left at each period of DACLO.

The parallel outputs CL1-5 of the shift register 9, together with the signals REBCO, CLOCO and CODE, address the memory 10, the signal CLOCO being another signal from the data source with a significance emplained below. For each configuration of the bits CL1-5 and of the signals CLOCO and CODE, the memory 10 generates an output a word M1-4 for each half-wave of the signal REBCO. As will be explained better hereinafter, the first word generates, if necessary, a bit signal, while the second generates, if necessary, a clock signal. The word M1-4 read from the memory 10 presets the counter 11, the reset enabling input of which is connected to the signal PUSUN, while the incrementing input is connected to the signal TENON.

The outputs of weights one and two of the counter 11 are applied to direct and negated inputs, respectively, of an AND gate 14, while the output of weight eight is applied to the input J of the flip-flop 12. The signal REGI which is the output from the AND circuit 14 is applied to the timing input of the flip-flop 12, while the direct reset input C is connected to the signal PUSUN. The flip-flop 12 generates as output the signal INREO, which is used by the recording element (not shown) included in the recording device 13.

In the case of the memory illustrated in FIG. 2, the arrangement is employed for encoding information in accordance with the frequency doubling recording code (hereinafter called FD) and the modified frequency modulation recording code (hereinafter called MFM). Moreover, for each of these codes there is provided the use of a special encoding which suppresses the timing pulses (hereinafter called MISSING), which is used during the stage of writing the sector addresses, in the case of magnetic discs, or for the addresses of the blocks, in the case of magnetic tapes. More particularly, the memory 10 is divided into eight sections selected by the logical levels of the signals CODE, CLOCO and REBCO in accordance with the following Table:

| CODE | CLOCO | REBCO | SELECTED ZONE | INREO | ENCODING |
|---|---|---|---|---|---|
| 0 | 0 | 0 | 27 | Clock | FD MISSING |
| 0 | 0 | 1 | 26 | Bit | FD MISSING |
| 0 | 1 | 0 | 23 | Clock | FD DATA |
| 0 | 1 | 1 | 22 | Bit | FD DATA |
| 1 | 0 | 0 | 25 | Clock | MFM MISSING |
| 1 | 0 | 1 | 24 | Bit | MFM MISSING |
| 1 | 1 | 0 | 21 | Clock | MFM DATA |
| 1 | 1 | 1 | 20 | Bit | MFM DATA |

During the operation of the arrangement of FIG. 1, the data source 7 sends the signals CLOCO and CODE which select one of the quadrants of the memory 10. More particularly, therefore, the combination CLOCO=1, CODE=1 requires that the data on the channel BY be encoded in MFM; the combination CLOCO=0, CODE=1 requires that the data on the channel BY be encoded in MFM with, moreover, suppression of the timing signals (MISSING); the combination CLOCO=1, CODE=0 requires that the data on the channel BY be encoded in FD; the combination CLOCO=0, CODE=0 requires that the data on the channel BY be encoded in FD with, moreover, suppression of the timing signals (MISSING).

Let us assume, for example, that the data source 7 selects the zones 20 and 21 for the encoding of the data in MFM (CLOCO=1, CODE=1). In this case the signal TENON will have a frequency of 18 MHz and, therefore, a period of 55 ns and, correspondingly, the signal DACLO will have a period of 2 $\mu$s (see FIG. 3).

The positive half-wave of the signal DACLO defines the time in which the bits CL1-5 remain constant in the shift register 9. During the first half of this period the signal REBCO is at logical 1 level, while during the second half it is at logical 0 level, thus selecting the zones 20 and 21 alternately. As has been said, the logical one level of the signal PUSUN enables the counter 11 and the flip-flop 12 and therefore the signal INREO can appear only during the positive half-wave of the signal PUSUN (FIG. 3).

The generation of a recording signal INREO takes place when the counter 11 reaches the configuration "1001", so that the generation of the signal INREO presupposes that the word read from the memory 10 contains a bit configuration less than "nine". More particularly, as regards the bits which do not require precompensation, this configuration is "six", that is "0110". In those cases in which it is not necessary to generate INREO, the word M1-4 contains the configuration "1110", which does not allow the counter 11 to reach the configuration "1001" within the limits of the positive half-wave of the signal PUSUN during which the counter 11 and the flip-flop 12 are enabled. It is pointed out that in the word read from the memory 10 the bit M1 is that of minimum weight, while the bit M4 is that of maximum weight.

If, on the other hand, the data source 7 requires encoding in FD, it will send the signal CLOCO=1 and the signal CODE=0. In this case, the signal DACLO will have a period of 4 $\mu$s (FIG. 4).

Similarly, the signal INREO will be generated at each negative half-wave of the signal REBCO for recording the clock signals which define the bit cells provided for by the encoding code. The bit signals, on the other hand, will be generated within the limits of the positive half-waves of the signal REBCO only if the bit CL3 examined in the shift register 9 has logical "1" level. When the signal INREO is not generated in correspondence with the positive half-waves of the signal PUSUN (see FIG. 3 or 4), the word M1-4 read from the memory 10 assumes the configuration "1110".

In the preferred embodiment, precompensation of errors in writing is effected only in correspondence with the MFM code (zone 20 of FIG. 2), since the FD code does not have such a high bit packing density as to require precompensation of reading errors.

Obviously, if the FD code is replaced another code, the corresponding zones 22, 23, 26, 27 can also include error precompensation. In FIG. 3, precompensation is performed on the pulses of types B and C, inasmuch as they are recorded very close together and, moreover, the preceding or following pulse is spaced to the maximum. This corresponds to having in the shift register 9 one of the bit configurations shown in the Table which require the corresponding correction.

| Type | CL1-5 | Word M1-4 | Correction |
|---|---|---|---|
| C | 01101 | 1001 | Advance |
| B | 10110 | 0011 | Delay |

| Type | CL1-5 | Word M1-4 | Correction |
|---|---|---|---|
| B | 10111 | 0011 | Delay |
| C | 11101 | 1001 | Advance |

From the Table and from FIG. 3 it can be observed how the generation of the signal INREO is effected taking account not only of the bit to be encoded which corresponds to the signal CL3 which is fed into the memory 10, but also of the two previously encoded bits CL1 and CL2 and of the two bits CL4 and CL5 which will be encoded subsequently. The word M1-4 which is the output of the memory 10 therefore takes account of the configuration of the signals INREO which will be recorded in a certain zone of the carrier.

This means that in the generation of the current signal INREO the memory 10 considers whether its position in relation to the preceding signal and the following signal requires to be shifted in advance or with delay. As can be seen from FIG. 3, in the configurations of type B the preceding signal INREO is spaced apart to the maximum, while the following one is spaced apart to the minimum. The error in reading will act on the signal B, shifting it towards the preceding signal and it is for this reason that the signal B is generated with delay during the writing (see FIG. 5). Since the counter 11 is incremented by the signal TENON, while the flip-flop 12 generates the signal INREO when the counter reaches the configuration "1001", the signal INREO is generated in a theoretical position if the word read from the memory 10 assumes the configuration "0110" (Type A). There is an advance if the word read is "1001", while there is a delay if the word read is "0011".

The advance or delay of the signal INREO in the theoretical position is by 165 ns, which corresponds to the error of delay or advance, respectively, encountered in reading in the signals C and B.

It is clearly apparent from the present description how, by means of a few hardware elements, the encoding arrangement enables encoding and precompensation in the recording stage in any codes, selectable by means of external signals, of information emitted by a data source to be effected.

I claim:

1. A device for encoding and recording on a carrier, by means of a recording element, information emitted by a data source comprising encoding means for encoding the information coming from said data source in a predetermined recording code, said encoding means generating sequences of signals forming the input to said recording element, error precompensation means included in said encoding means for selectively introducing advances or delays into said sequences of signals, said error precompensation means comprising an addressable memory for permanently storing words corresponding to the advance or delay required by each sequence of signals, a shift register adapted to store the information sequentially in bits, at least part of the shift register being adapted to address said memory, said shift register being enabled to shift the information contained therein by a first timing signal generated by a timing circuit, a counter preset by said words and adapted to be incremented by a second timing signal generated by said timing circuit for generating corresponding advanced or delayed signals, and decoding means adapted to receive said advanced or delayed signals for generating said sequence of signals for said recording element.

2. Encoding and recording device according to claim 1, wherein the encoding means are controllable by means of external signals for encoding the information coming from said source in a code selected from among a plurality of recording codes.

3. Encoding and recording device according to claim 2, wherein said words stored in said memory are subdivided into a plurality of blocks, the words of the blocks being addressable jointly by the said information and the said external signals.

4. Encoding and recording device according to claim 1, wherein, during the same period of residence of an information item in the shift register, one of the said external signals enables two separate zones of the memory alternately, whereby two different words are obtained in succession as output from the memory during the period of residence of the information in the shift register timed by the first signal.

5. Encoding and recording arrangement according to claim 4, wherein one of said external signals enables a first zone of the memory or a second zone of the memory, both addressed by the information in the shift register, the first of the zones of the memory encoding in accordance with a first code belonging to said plurality of codes by means of said pairs of words, one following the other, adapted to program the counter, and the second of the zones of the memory encoding according to a second code belonging to the said plurality of codes, wherein the second word programs the counter unambiguously in such manner as to obtain special forms of the said sequences of signals for said recording element.

* * * * *